000
(12) United States Patent
Ayrignac et al.

(10) Patent No.: US 7,971,040 B2
(45) Date of Patent: Jun. 28, 2011

(54) METHOD AND DEVICE FOR SAVING AND RESTORING A SET OF REGISTERS OF A MICROPROCESSOR IN AN INTERRUPTIBLE MANNER

(75) Inventors: Renaud Ayrignac, Grenoble (FR); Isabelle Sename, Grenoble (FR)

(73) Assignee: STMicroelectronics SA, Montrouge (FR)

( * ) Notice: Subject to any disclaimer, the term of this patent is extended or adjusted under 35 U.S.C. 154(b) by 178 days.

(21) Appl. No.: 11/567,998

(22) Filed: Dec. 7, 2006

(65) Prior Publication Data
US 2007/0294517 A1    Dec. 20, 2007

(30) Foreign Application Priority Data
Dec. 9, 2005 (FR) ...................... 05 12502

(51) Int. Cl.
*G06F 7/38* (2006.01)
*G06F 9/00* (2006.01)
*G06F 9/44* (2006.01)
(52) U.S. Cl. ........................................ 712/228
(58) Field of Classification Search ............... 712/228
See application file for complete search history.

(56) References Cited

U.S. PATENT DOCUMENTS

| 4,398,244 A | * | 8/1983 | Chu et al. ................ 712/244 |
| 4,484,271 A | * | 11/1984 | Miu et al. ................ 712/244 |
| 4,764,869 A | | 8/1988 | Miyazaki et al. ............ 364/300 |
| 4,879,687 A | * | 11/1989 | Okamoto et al. ............ 365/200 |
| 5,325,494 A | | 6/1994 | Imai et al. .................... 395/375 |
| 5,784,607 A | | 7/1998 | Henry et al. ................. 395/595 |
| 6,199,143 B1 | | 3/2001 | Segal ........................... 711/120 |
| 6,205,467 B1 | | 3/2001 | Lambrecht et al. .......... 709/108 |
| 2005/0102494 A1 | * | 5/2005 | Grochowski et al. ........ 712/228 |

OTHER PUBLICATIONS

Craig et al., "nanoProtean: Scalable System Software for a Gigabit Active Router", 2001.*
"Technique to Improve Context Switching Performance in a CPU," IBM Technical Disclosure Bulletin, IBM Corp., New York, vol. 33, No. 3B, Aug. 1, 1990, pp. 472-473.
Sloss, A.N., "Interrupt Handling," Apr. 25, 2001, pp. 1-68.

* cited by examiner

*Primary Examiner* — Chun-Kuan Lee
*Assistant Examiner* — Jesse R Moll
(74) *Attorney, Agent, or Firm* — Lisa K. Jorgenson; Thomas J. Satagaj; Seed IP Law Group PLLC (57) ABSTRACT

The disclosure relates to a method for executing by a processor an instruction for saving/restoring several internal registers of the processor. The method comprises breaking down the saving/restoring instruction to generate micro-instructions for saving/restoring the content of a register, executing each of the micro-instructions, initializing a progress status of the saving/restoration of the registers, updating the progress status of the saving/restoration upon each generation of a micro-instruction for saving/restoring a register, saving the progress status in the event of an interruption in the saving/restoration of the registers to execute a higher-priority task, and restoring the progress status when the saving/restoration of the registers is resumed.

31 Claims, 6 Drawing Sheets

METHOD AND DEVICE FOR SAVING AND RESTORING A SET OF REGISTERS OF A MICROPROCESSOR IN AN INTERRUPTIBLE MANNER

BACKGROUND OF THE INVENTION

1. Field of the Invention

The methods, systems, and devices described generally relate to microprocessors and microcontrollers, and more particularly to mechanisms for changing context in the event of an interruption in a task by a higher-priority task.

2. Description of the Related Art

Certain microprocessors or microcontrollers offer the possibility of switching from a task being executed to another higher-priority task. This switch is triggered by the appearance of an event, for example an external signal on an input line of the microprocessor. When such an event occurs, the microprocessor must save the context of the interrupted task, i.e., the content of the registers of the microprocessor. The saved context is restored at the end of the execution of the higher-priority task, when the execution of the interrupted task is resumed. The context is generally saved using a memory stack provided for temporarily storing a large quantity of data. A memory stack is generally managed so that the last datum stored (saved) therein is the first to be extracted (restored).

Microprocessors comprise a register, called a "stack pointer," dedicated to managing the memory stack. The stack pointer contains the memory address of the last datum stored in the memory stack (or of the first address available).

The set of instructions of microprocessors comprises instructions for accessing the memory stack, i.e., particularly saving instructions called "PUSH," enabling the content of a register to be saved in the memory stack and restoring instructions called "POP" enabling the content of a register previously saved in the memory stack to be restored.

A memory stack can be managed in two ways. It can increase towards the lower memory addresses or towards the higher memory addresses. If it increases towards the higher memory addresses, the execution of a PUSH instruction is preceded by an incrementation of the stack pointer, while the execution of a POP instruction is followed by a decrementation of the latter. Conversely, if the memory stack increases towards the lower memory addresses, the execution of a PUSH instruction is preceded by a decrementation of the stack pointer, while the execution of a POP instruction is followed by an incrementation of the latter.

The use of a memory stack for saving task contexts offers the advantage of being able to manage a large number of task priority levels, within the limit of the memory size allocated to the memory stack. Most microprocessors with RISC (Reduced Instruction Set Computer) use such a memory stack.

When the microprocessor comprises a large number of registers, the operations of saving and restoring the context can be very expensive in program memory size, if a saving instruction and a restoring instruction must be provided in the program for each register. To optimize the use of the program memory, certain microprocessors comprise, in their set of instructions, saving and restoring instructions for saving and restoring several of their registers. During a predecoding operation, the instruction is broken down into one or more micro-instructions that each control the saving or the restoration of a register. The micro-instructions are then executed successively by the microprocessor.

The result is that the execution of an instruction for saving or restoring registers can last a large number of clock cycles of the microprocessor. As the breakdown into micro-instructions is done by the internal decoding circuits of the microprocessor, the micro-instructions are not included in the program memory. As a result, the execution of an instruction for saving or restoring several registers cannot be interrupted by a higher-priority task. The result is an interrupt latency time (time between the appearance of the event that triggers an interruption or of a higher-priority task and the start of the execution of the interrupt routine or of the higher-priority task) which can be incompatible with the real-time requirements of certain systems.

BRIEF SUMMARY OF THE INVENTION

One embodiment reduces the interrupt latency time in a method and a device for executing a saving/restoring instruction for saving/restoring several internal registers of a processor.

One embodiment is a processor (microprocessor or microcontroller) comprising context-saving/restoring instructions in its set of instructions, the execution of which has a reduced interrupt latency time.

One embodiment is a method for executing by a processor an instruction for saving/restoring several registers of the processor. The method includes breaking down the saving/restoring instruction to generate micro-instructions for saving/restoring the content of a register; executing each of the micro-instructions; initializing a progress status of the saving/restoration of the registers; updating the progress status of the saving/restoration upon each generation of a micro-instruction for saving/restoring a register; and saving the progress status in the event of an interruption in the saving/restoration of the registers to execute a higher-priority task, and restoring the progress status when the saving/restoration of the registers is resumed.

According to one embodiment of the present invention, the progress status of the saving/restoration is stored in a status register of the processor.

According to one embodiment of the present invention, the status register of the processor is automatically stored in the event of an interruption in the execution of a task by a higher-priority task.

According to one embodiment of the present invention, the saving/restoring instruction concerns all the registers of a set of general registers of the processor.

According to one embodiment of the present invention, the registers to be saved/restored are indicated in a binary word associated with the saving/restoring instruction.

According to one embodiment of the present invention, each bit on 1 of the binary word indicates by its rank in the binary word a number of a register to be saved/restored, the method comprising steps of extracting the rank of a bit on one of the binary number.

According to one embodiment of the present invention, the progress status of the saving/restoration is stored in the form of a binary word the bits of which in a predefined state indicate by their rank the registers already saved/restored.

According to one embodiment of the present invention, the progress status of the saving/restoration is initialized at the end of the execution of the saving/restoring instruction, to an initial value indicating that no register has been saved or restored.

According to one embodiment of the present invention, the progress status of the saving/restoration is initialized after being saved, in the event of an interruption in the saving/restoration of registers.

One embodiment is a device for executing an instruction for saving/restoring several registers of a processor. The device comprises an expansion unit to break down an instruction for saving/restoring several registers and to generate micro-instructions for saving/restoring the content of a register executable by an execution stage of the processor; means for initializing a progress status of the execution of an instruction for saving/restoring registers; circuits for updating the progress status upon each generation of a micro-instruction for saving/restoring a register; and means for saving the progress status in the event of an interruption in the execution of an instruction for saving/restoring registers by a higher-priority task, and for restoring the progress status when the execution of the saving/restoring instruction is resumed.

According to one embodiment of the present invention, the saving/restoring instruction concerns all the registers of a set of general registers of the processor.

According to one embodiment of the present invention, the registers to be saved/restored are indicated in a binary word associated with the saving/restoring instruction.

According to one embodiment of the present invention, each bit on 1 of the binary word indicates by its rank in the binary word a number of a register to be saved/restored, the device comprising circuits for extracting the rank of a bit on one of the binary number.

According to one embodiment of the present invention, the progress status of the saving/restoration is stored in the form of a binary word the bits on 0 of which indicate by their rank the registers already saved/restored.

According to one embodiment of the present invention, the device comprises means for initializing the progress status of the saving/restoration at the end of the execution of the saving/restoring instruction, to an initial value indicating that no register has been saved or restored.

According to one embodiment of the present invention, the device comprises means for initializing the progress status of the saving/restoration after saving the progress status of the saving/restoration, in the event of an interruption in the saving/restoration of the registers.

One embodiment is a processor that includes:
a set of general registers, and
a set of instructions comprising instructions for saving/restoring several general registers;
a device for executing a saving/restoring instruction as defined above.

According to one embodiment of the present invention, the progress status of the saving/restoration is stored in a status register of the processor.

According to one embodiment of the present invention, the processor comprises means for automatically storing the status register of the processor in the event of an interruption in the execution of a task by a higher-priority task.

According to one embodiment of the present invention, the processor has a pipeline-type architecture, and the device belongs to a read and pre-decode stage enabling an instruction to be read in the program memory and the instruction read to be pre-decoded.

According to one embodiment of the present invention, the processor is of a microprocessor or microcontroller type.

BRIEF DESCRIPTION OF THE SEVERAL VIEWS OF THE DRAWINGS

These and other advantages and features shall be presented in greater detail in the following description of a preferred embodiment of the present invention, given in relation with, but not limited to the following figures, in which.

DETAILED DESCRIPTION OF THE INVENTION

Figure 1:
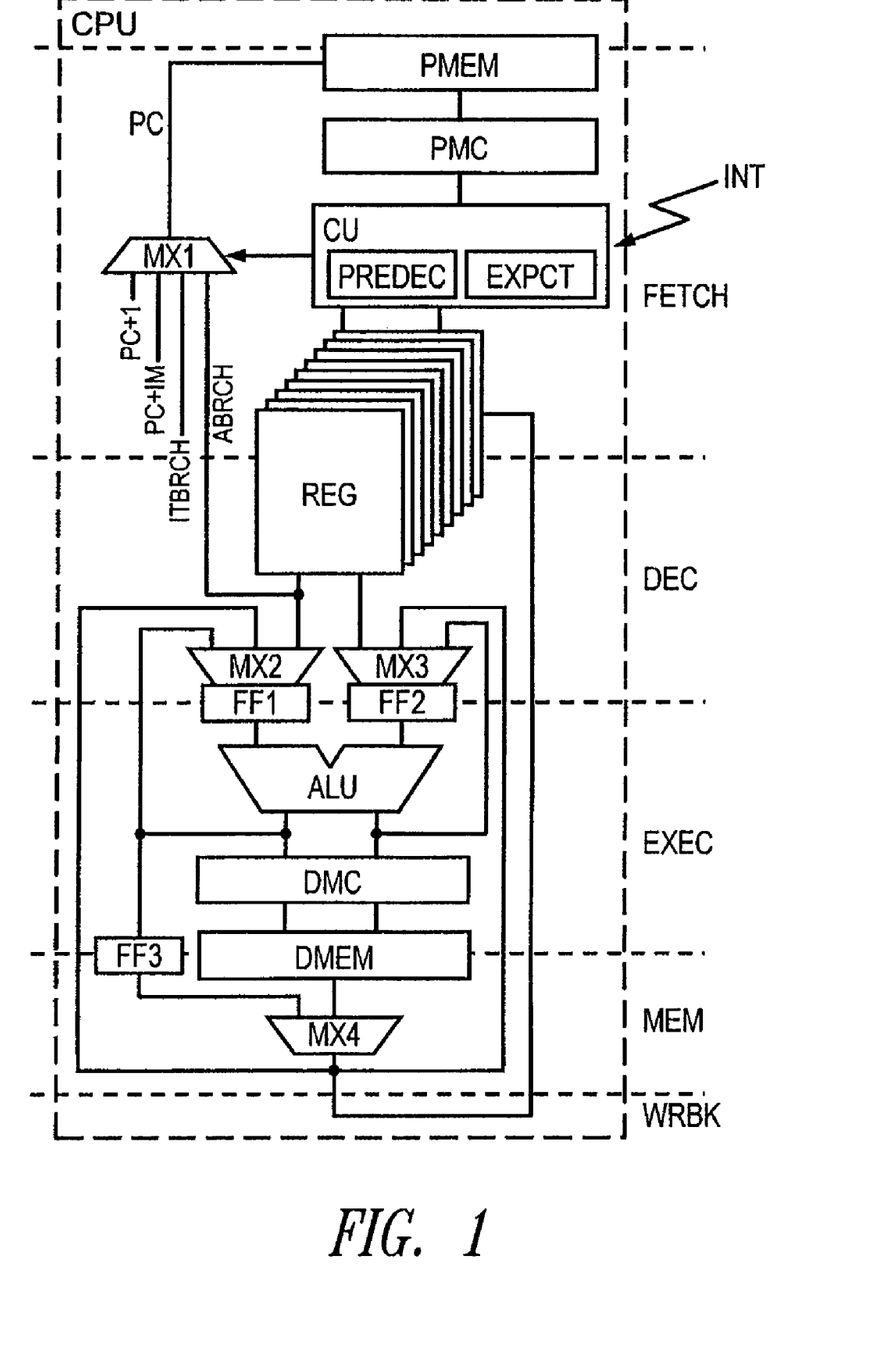
FIG. 1 represents in block form the architecture of an exemplary microcontroller.

FIG. 1 represents an example of architecture of a central processing unit CPU of a microcontroller. The central processing unit has a pipeline-type architecture, i.e., with several stages functioning in series on one instruction and in parallel on successive instructions. Thus, the central processing unit comprises, for example, the following five stages:

a reading and predecoding stage FETCH for reading an instruction in the program memory and predecoding the instruction read, a decoding stage DEC for decoding the predecoded instruction, an execution stage EXEC for executing the decoded instruction, a stage MEM for accessing the data memory to read or write a datum in the data memory, and a writing stage WRBK for writing a datum in a register.

The stage FETCH comprises a program memory PMEM, a management unit for managing the program memory PMC, a control unit CU and a multiplexer MX1 for selecting a program instruction pointer value PC according to a control signal sent by the control unit CU. The program memory PMEM may comprise a cache memory.

The control unit CU is connected to a register bank REG of the microcontroller, and comprises an instruction predecoding unit PREDEC.

The multiplexer MX1 selects a value to be allocated to an instruction pointer PC in the program memory PMEM. The value selected is either the value of the instruction pointer PC incremented by 1 to access the next instruction in the program memory, or the value of the instruction pointer added to a value IM to execute a relative jump, or a branch address ABRCH to execute an absolute jump to a specified address, or an interruption address ITBRCH to start the execution of an interrupt or exception routine.

The decoding stage DEC comprises multiplexers MX2, MX3 each comprising an input connected to a respective port of the register bank REG. The multiplexers MX2 and MX3 are intended to mask the latencies when successive instructions depend on each other.

The execution stage EXEC comprises an arithmetic and logic unit ALU comprising two inputs each linked to a respective output of the multiplexers MX2, MX3 through a flip-flop FF1 FF2. The unit ALU comprises a data output and an address output linked to a data memory DMEM through a unit for managing the data memory DMC. Each output of the unit ALU is also connected to an input of the multiplexers MX2, MX3. The data memory may also comprise a cache memory.

The stage MEM comprises a multiplexer MX4 comprising an input receiving the data read in the memory DMEM and an input connected to the data output of the unit ALU through a flip-flop FF3. The multiplexer MX4 comprises an output connected to an input of each of the multiplexers MX2, MX3.

The stage WRBK comprises a link between the output of the multiplexer MX4 and an input of the register bank REG. This link enables a datum read in the memory DMEM or coming from the unit ALU to be stored in a register of the register bank REG.

Figure 2:
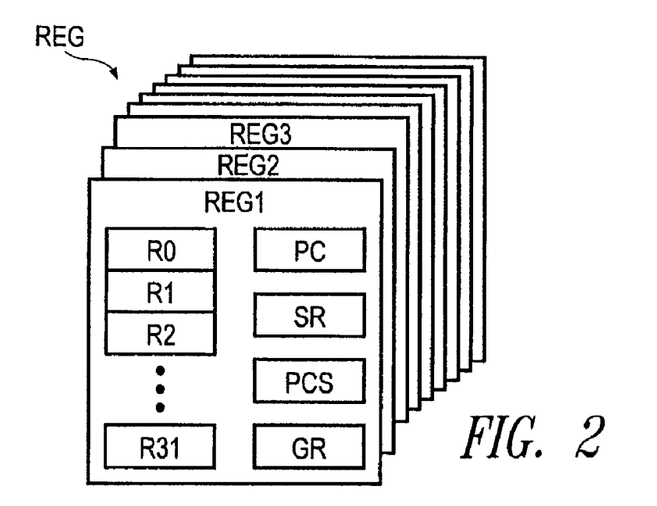
FIG. 2 represents registers of the exemplary microcontroller

FIG. 2 represents an exemplary register bank REG. In this figure, the register bank REG comprises several sets of registers REG1, REG2, REG3, etc. Each set of registers is associated with an execution context enabling the microcontroller to execute several tasks in parallel, each task having its own set of registers REGi. Thus, it is not necessary to save and restore the content of the registers in a memory stack when a task is interrupted by a higher-priority task, if both tasks use different sets of registers REGi.

Each set of registers REGi comprises general registers R0-R31 used to process addresses and data, and status and control registers of the microcontroller. The general registers particularly comprise a stack pointer register. The status and control registers comprise a program pointer register PC, a status register SR, an operating mode register PCS and an instruction saving register GR enabling jump instructions and conditional instructions to be executed more efficiently.

The microcontroller comprises a set of instructions comprising instructions that can be broken down into micro-instructions executable by the stage EXEC. The control unit CU comprises an instruction expansion unit EXPCT for breaking down instructions of the set of instructions into micro-instructions.

The instruction set of the microcontroller particularly comprises saving instructions PUSH and restoring instructions POP for saving and restoring one or more registers of a set of registers REGi. For example, the saving instructions PUSH and restoring instructions POP comprise instructions for saving and restoring the first 16 general registers R0-R15, and the last 16 general registers R16-R31. These instructions are associated with an immediate value on 16 bits indicating which registers are to be saved or restored out of the first 16 or last 16 general registers. For example, the rank of each bit on 1 of the immediate value corresponds to the number of the register to be saved or to be restored (possibly shifted by 16). Alternatively, the registers to be saved or to be restored are specified in a control register which is loaded prior to the execution of the PUSH or POP instruction.

Figure 3:
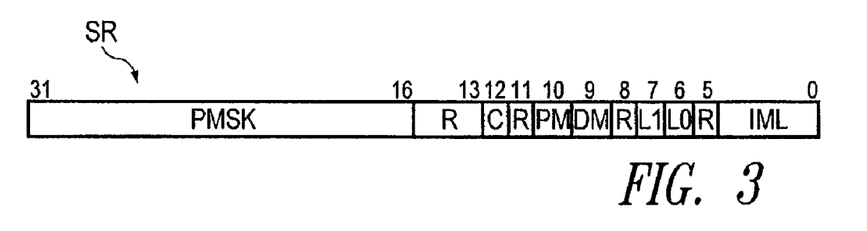
FIG. 3 shows the content of a state register of the exemplary microcontroller.

FIG. 3 represents the content of an exemplary status register SR. The register SR comprises reserved fields R, an interrupt mask field IML on 5 bits, fields L0, L1 indicating the activation status of hardware loops on 1 bit, a field DM indicating the activation status of a debug mode on 1 bit, a field PM indicating the activation status of a privilege mode on 1 bit, and a carry field C on 1 bit used by the unit ALU.

According to at least one embodiment, the register SR also comprises a field PMSK storing on 16 bits the progress status of the execution of an instruction for saving or restoring the first 16 R0-R15 or the last 16 general registers R16-R31. More precisely, the field PMSK stores the numbers of the registers that have not been saved or restored. This field is updated each time a saving or restoring micro-instruction is generated. This arrangement enables the saving PUSH and restoring POP instructions to be rendered interruptible.

For example, each bit of the field PMSK corresponds to a register number. During the execution of a PUSH instruction, all the least significant bits of the field PMSK are on 0 up to the bit whose rank corresponds to the number of the last register saved (shifted by 16 if the instruction relates to the registers R16 to R31), and all the other bits of the field PMSK are on 1. During the execution of a POP instruction, all the most significant bits of the field PMSK are on 0 up to the bit whose rank corresponds to the number of the last register saved (shifted by 16 if the instruction relates to the registers R16 to R31), and all the other bits of the field are on 1.

Figure 4:
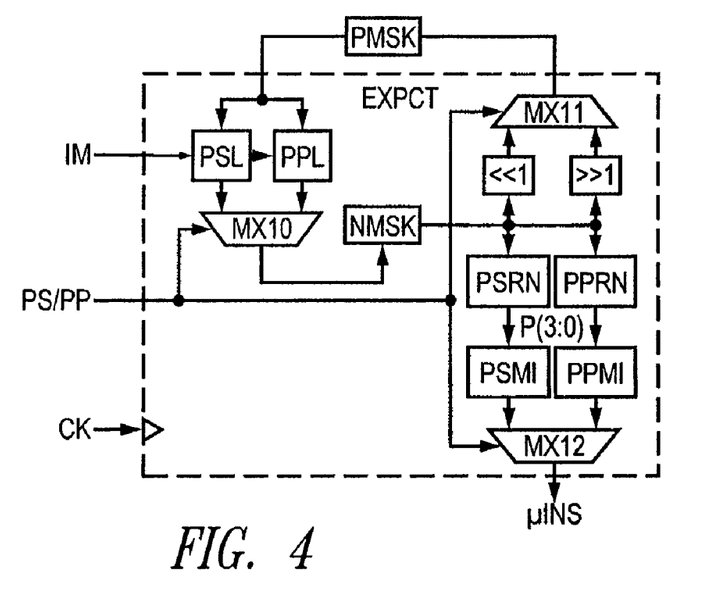
FIG. 4 represents in block form an exemplary instruction expansion unit to generate saving/restoring micro-instructions for saving/restoring a register, according to at least one embodiment.

FIG. 4 represents an exemplary instruction expansion unit EXPCT. To process PUSH or POP instructions, the expansion unit EXPCT comprises:

a register NMSK for storing an intermediate value, a logic circuit PSL for updating the content of the register NMSK when the instruction to be processed is a PUSH instruction, a logic circuit PPL for updating the content of the register NMSK when the instruction to be processed is a POP instruction, three multiplexers MX10, MX11, MX12 controlled by a binary signal PS/PP indicating whether the instruction to be processed is a PUSH or POP instruction, a left shift circuit <<1 and a right shift circuit >>1, a logic circuit PSRN for calculating a number of a register to be saved according to the content of the register NMSK, a logic circuit PPRN for calculating a number of a register to be restored according to the content of the register NMSK, a logic circuit PSMI enabling a PUSH Ri-type micro-instruction µINS to be generated using the register number P(3:0) supplied by the circuit PSRN, and a logic circuit PPMI enabling a POP Ri-type micro-instruction µINS to be generated using the register number P(3:0) supplied by the circuit PPRN.

The circuits PSL and PPL receive at input the value of the field PMSK and the immediate value IM associated with the saving or restoring instruction, indicating the numbers of the registers to be saved or to be restored. The output of the circuits PSL and PPL is linked to the input of the register NMSK through the multiplexer MX10 which applies to the register NMSK the output value of the circuit PSL or of the circuit PPL depending on the value of the signal PS/PP. The register NMSK comprises an output connected to the left <<1 and right >>1 shift circuits. The shift circuits supply at output the value of the register left and right shifted by 1 bit respectively. The output of each of the shift circuits is linked to the input of the field PMSK through the multiplexer MX11 which selects the output of one or other of the shift circuits depending on the value of the signal PS/PP. The output of the register NMSK is also connected to the logic circuits PSRN and PPRN. The logic circuits PSRN and PPRN each comprise an output supplying a register number P(3:0) on 3 bits of the register to be saved or to be restored. The output of the circuit PSRN is connected to the input of the circuit PSMI, and the output of the circuit PPRN is connected to the input of the circuit PPMI. The output of each of the circuits PSMI and PPMI is connected to an input of the multiplexer MX12 the output of which supplies a micro-instruction µINS executable by the execution stage EXEC.

The expansion unit EXPCT is paced by the clock signal CK of the microcontroller so that the register NMSK and the field PMSK are updated once every clock cycle.

Figure 5:
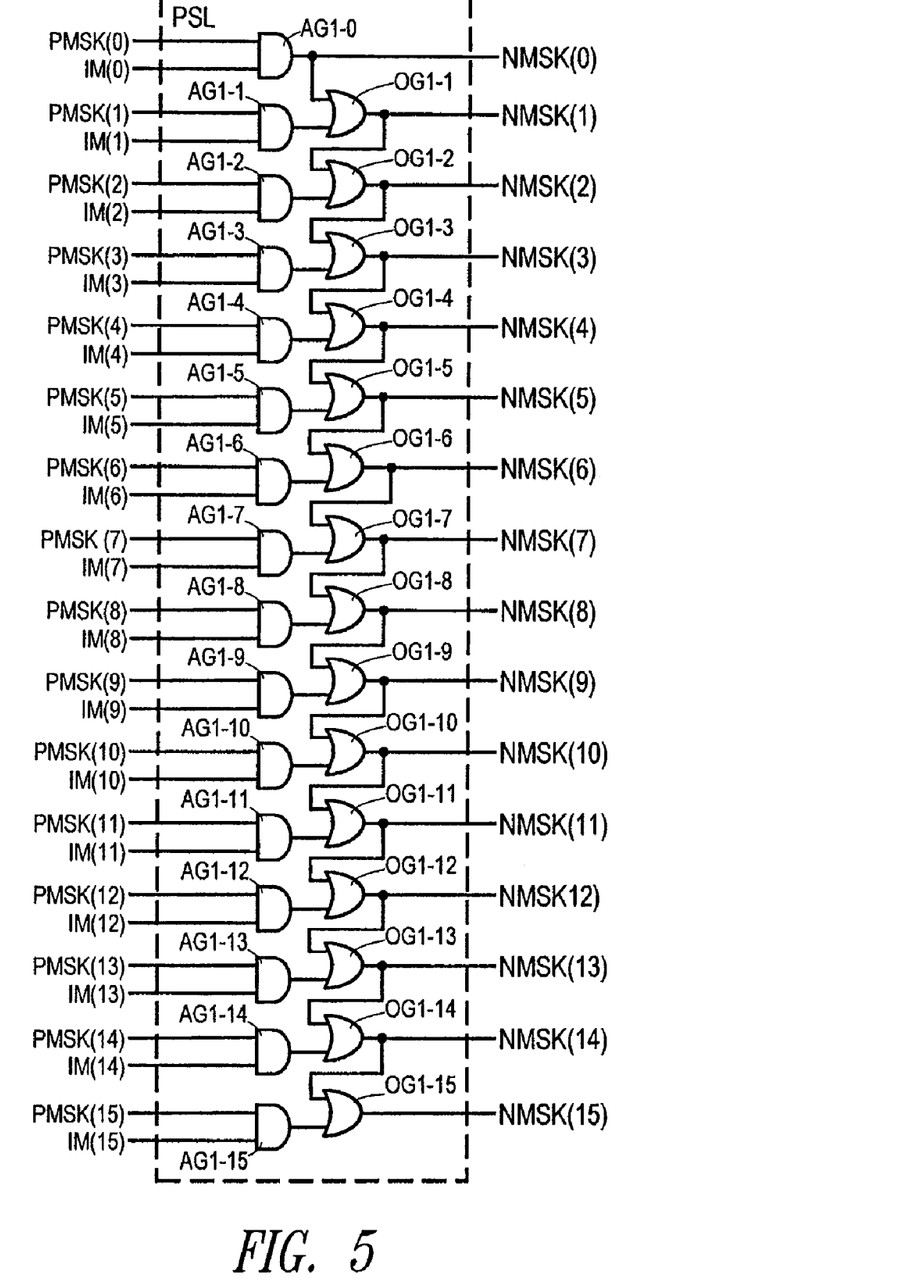
FIGS. 5 to 8 are wiring diagrams of circuits of the exemplary expansion unit represented in FIG. 4.

FIG. 5 is the wiring diagram of the circuit PSL. This circuit comprises 16 AND-type logic gates AG1-0 to AG1-15, and 15 OR-type logic gates OG1-1 to OG1-15. Each of the gates AG1-i receives at input a bit PMSK(i) of the field PMSK and a bit IM(i) of the same rank i of the immediate value IM associated with the PUSH, POP instruction to be executed (i being a whole number ranging from 0 to 15). The output of the gate AG1-0 receiving the bits PMSK(0) and IM(0) of rank 0 at input, supplies a bit NMSK(0) of the same rank, which is stored in the register NMSK. Each of the outputs of the other gates AG1-*i* (i ranging from 1 to 15) is connected to an input of the gate OG1-*i* another input of which is connected to the output of the gate AG1-(*i*-1) receiving the bits PMSK(i-1) and IM(i-1) of immediately lower rank i-1. Each of the outputs of the gates OG1-*i* supplies a bit NMSK(i) of rank i, which is stored in the register NMSK. Thus, the circuit PSL calculates as follows:

$$NMSK(0)=PMSK(0) \text{ AND } IM(0) \qquad (1)$$

$$NMSK(i)=(PMSK(i) \text{ AND } IM(i) \text{ OR } NMSK(i-1)), \qquad (2)$$

i being a whole number varying from 1 to 15.

Figure 6:
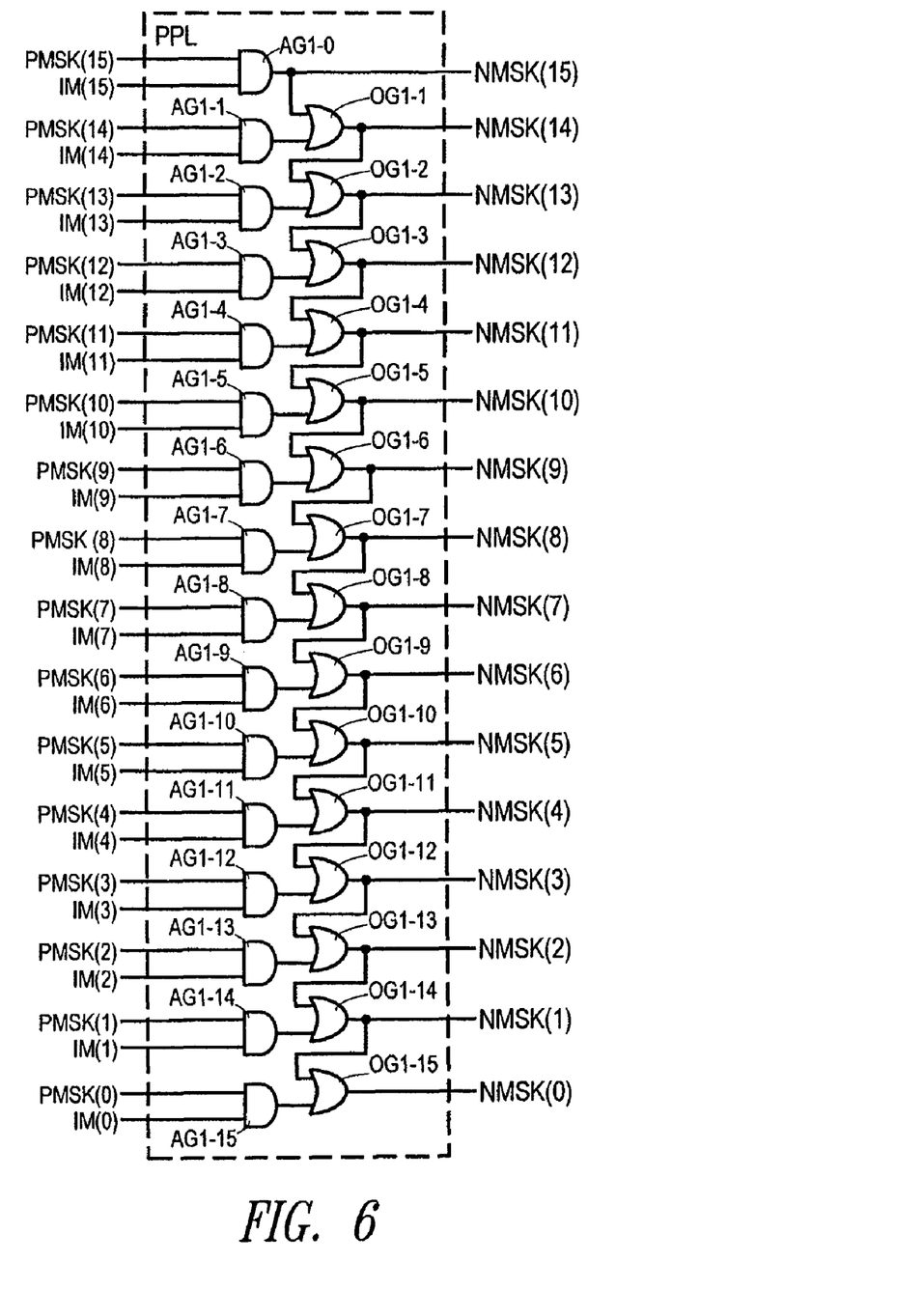

FIG. 6 is the wiring diagram of the circuit PPL. This circuit is identical to the circuit PSL, but the inputs and the outputs of this circuit are inverted. Thus, the bits PMSK(15) and IM(15) of rank 15 are applied to the gate AG1-0 that supplies the bit NMSK(15) of the same rank of the value of the register NMSK. The bits PMSK(15-*j*) and IM(15-*j*) of rank 15-*j* are applied to the gate AG1-*j*, and the bits NMSK(15-*j*) of rank 15-*j* are supplied by the gates OG1-*j* (j being a whole number ranging from 1 to 15). Thus, the circuit PPL calculates as follows:

$$NMSK(15)=PMSK(15) \text{ AND } IM(15) \qquad (3)$$

$$NMSK(i)=(PMSK(i) \text{ AND } IM(i)) \text{ OR } NMSK(i+1), \qquad (4)$$

i being a whole number varying from 14 to 0.

Figure 7:
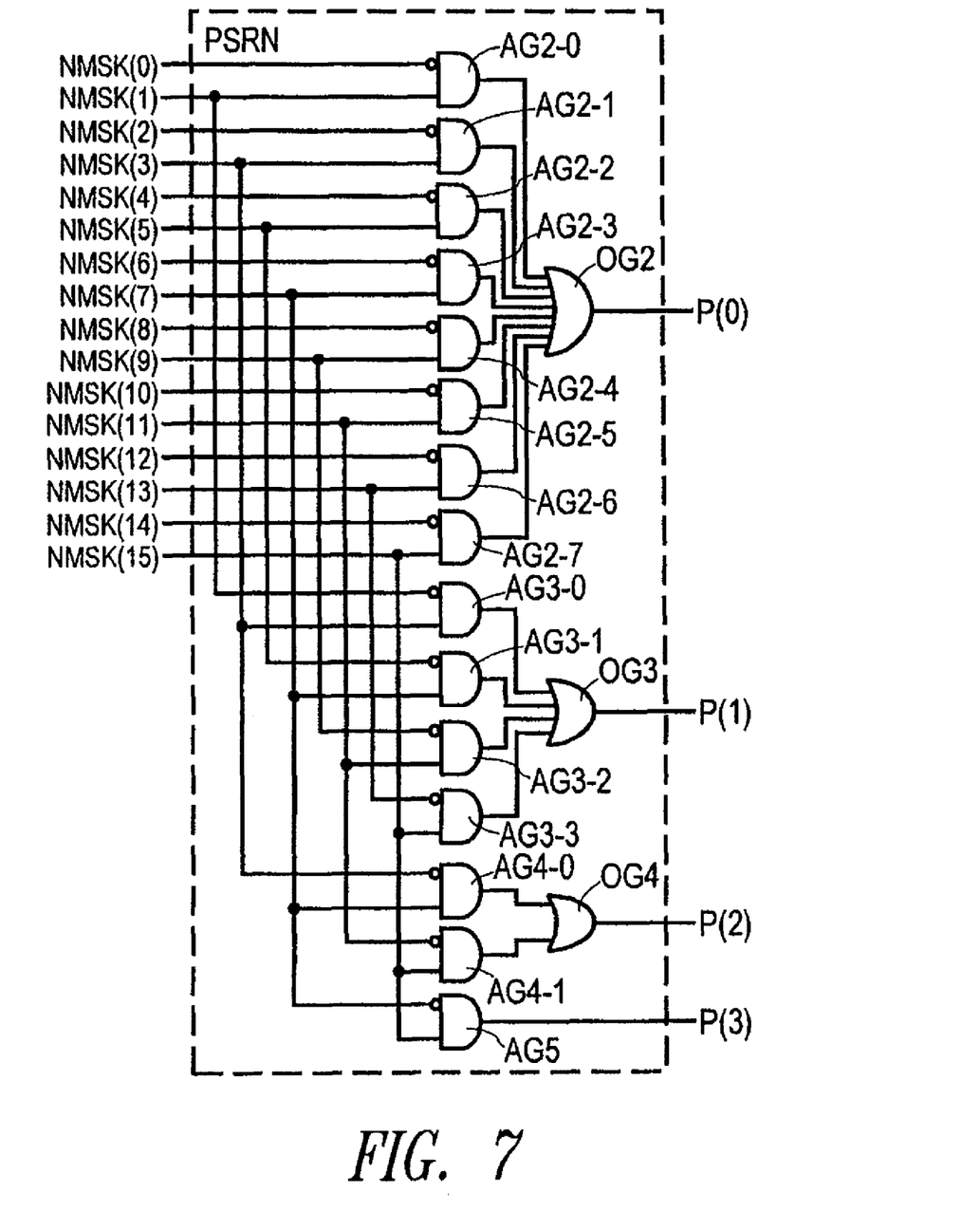

FIG. 7 is the wiring diagram of the circuit PSRN. The circuit PSRN comprises AND-type logic gates AG2-0 to AG2-7, AG3-0 to AG3-3, AG4-0, AG4-1 and AG5, comprising an inverted input and a non-inverted input, and three OR-type logic gates OG2, OG3, OG4. The inverted input of each of the gates AG2-*i* receives the bit NMSK(2*i*), and the non-inverted input of these gates receives the bit NMSK(2*i*+1), i being a whole number ranging from 0 to 7. The outputs of the gates AG2-*i* are connected to a respective input of the logic gate OG2 one output of which supplies the bit P(0) of rank 0 of the number of the register to be saved.

The inverted input of each of the gates AG3-*j* receives the bit NMSK(4*j*+1), and the non-inverted input of these gates receives the bit NMSK(4*j*+3), j being a whole number ranging from 0 to 3. The outputs of the gates AG3-*j* are connected to an input of the gate OG3 one output of which supplies the bit P(1) of rank 1 of the number of the register to be saved.

The inverted input of each of the gates AG4-*k* receives the bit NMSK(8*k*+3), and the non-inverted input of these gates receives the bit NMSK(8*k*+7), k being a whole number equal to 0 or 1. The outputs of the gates AG4-*k* are connected to an input of the gate OG4 one output of which supplies the bit P(2) of rank 2 of the number of the register to be saved.

The inverted input of the gate AG5 receives the bit NMSK(7), and the non-inverted input of this gate receives the bit NMSK(15). An output of the gate AG5 supplies the bit P(3) of rank 3 of the number of the register to be saved.

Thus the circuit PSRN calculates as follows:

$$\begin{aligned} P(0) = &(NMSK\,(1) \text{ AND NOT } NMSK\,(0)) \text{ OR} \\ &(NMSK\,(3) \text{ AND NOT } NMSK\,(2)) \text{ OR} \\ &(NMSK\,(5) \text{ AND NOT } NMSK\,(4)) \text{ OR} \\ &(NMSK\,(7) \text{ AND NOT } NMSK\,(6)) \text{ OR} \\ &(NMSK\,(9) \text{ AND NOT } NMSK\,(8)) \text{ OR} \\ &(NMSK\,(11) \text{ AND NOT } NMSK\,(10)) \text{ OR} \\ &(NMSK\,(13) \text{ AND NOT } NMSK\,(12)) \text{ OR} \\ &(NMSK\,(15) \text{ AND NOT } NMSK\,(14)) \end{aligned} \qquad (5)$$

$$\begin{aligned} P(1) = &(NMSK\,(3) \text{ AND NOT } NMSK\,(1)) \text{ OR} \\ &(NMSK\,(7) \text{ AND NOT } NMSK\,(5)) \text{ OR} \\ &(NMSK\,(11) \text{ AND NOT } NMSK\,(9)) \text{ OR} \\ &(NMSK\,(15) \text{ AND NOT } NMSK\,(13)) \end{aligned} \qquad (6)$$

$$\begin{aligned} P(2) = &(NMSK\,(15) \text{ AND NOT } NMSK\,(11)) \text{ OR} \\ &(NMSK\,(7) \text{ AND NOT } NMSK\,(3)) \end{aligned} \qquad (7)$$

$$P(3) = NMSK\,(15) \text{ AND NOT } NMSK\,(7) \qquad (8)$$

Figure 8:
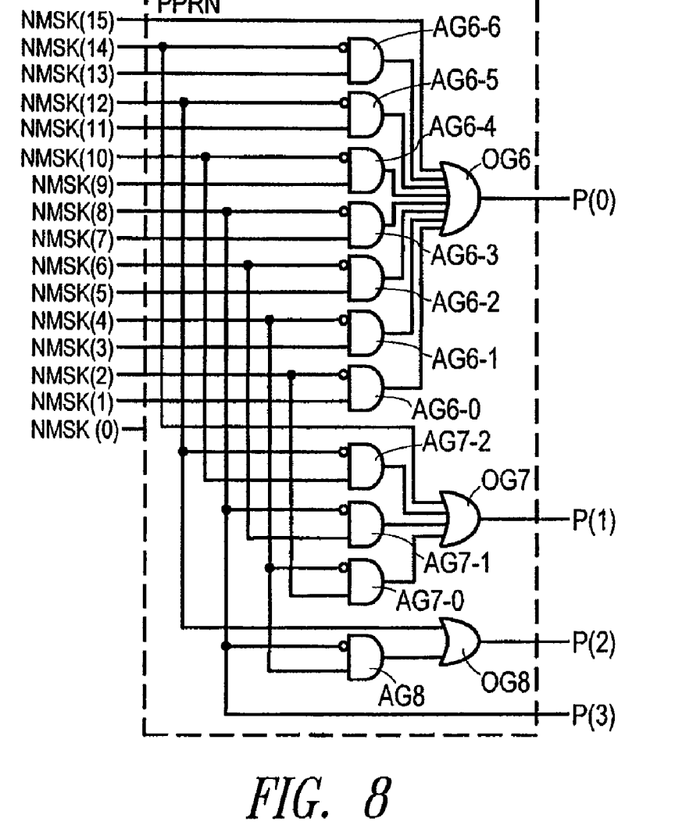

FIG. 8 is the wiring diagram of the circuit PPRN. The circuit PPRN comprises AND-type logic gates AG6-0 to AG6-6, AG7-0 to AG7-2 and AG8, comprising an inverted input and a non-inverted input, and three OR-type logic gates OG6, OG7, OG8. The inverted input of each of the AND gates AG6-*i* receives the bit NMSK(2*i*+2), and the non-inverted input of these gates receives the bit NMSK(2*i*+1), i being a whole number ranging from 0 to 6. The bit NMSK(15) and the outputs of the gates AG6-*i* are connected to a respective input of the logic gate OG6 one output of which supplies the bit P(0) of rank 0 of the number of the register to be restored.

The inverted input of each of the gates AG7-*j* receives the bit NMSK(4*j*+4), and the non-inverted input of these gates receives the bit NMSK(4*j*+2), j being a whole number ranging from 0 to 2. The bit NMSK(14) and the outputs of the gates AG7-*j* are connected to an input of the gate OG7 one output of which supplies the bit P(1) of rank 1 of the number of the register to be restored.

The inverted input of the gate AG8 receives the bit NMSK(8), and the non-inverted input of this gate receives the bit NMSK(4). The bit NMSK(12) and the output of the gate AG8 are connected to an input of the gate OG8 one output of which supplies the bit P(2) of rank 2 of the number of the register to be restored. The bit NMSK(8) supplies the bit P(3) of rank 3 of the number of the register to be restored.

Thus the circuit PPRN calculates as follows:

$$\begin{aligned} P(0) = &NMSK\,(15) \text{ OR } (NMSK\,(13) \text{ AND NOT } NMSK\,(14)) \\ &\text{OR } (NMSK\,(11) \text{ AND NOT } NMSK\,(12)) \\ &\text{OR } (NMSK\,(9) \text{ AND NOT } NMSK\,(10)) \\ &\text{OR } (NMSK\,(7) \text{ AND NOT } NMSK\,(8)) \\ &\text{OR } (NMSK\,(5) \text{ AND NOT } NMSK\,(6)) \\ &\text{OR } (NMSK\,(3) \text{ AND NOT } NMSK\,(4)) \\ &\text{OR } (NMSK\,(1) \text{ AND NOT } NMSK\,(2)) \end{aligned} \qquad (9)$$

$$\begin{aligned} P(1) = &NMSK\,(14) \text{ OR } (NMSK\,(10) \text{ AND NOT } NMSK\,(12)) \\ &\text{OR } (NMSK\,(6) \text{ AND NOT } NMSK\,(8)) \\ &\text{OR } (NMSK\,(2) \text{ AND NOT } NMSK\,(4)) \end{aligned} \qquad (10)$$

$$P(2) = NMSK\,(12) \text{ OR } (NMSK\,(4) \text{ AND NOT } NMSK\,(8)) \qquad (11)$$

$$P(3) = NMSK\,(8) \qquad (12)$$

When the microcontroller is initialized, the field PMSK is initialized to the value 0xFFFF. At each clock cycle CK when a PUSH- or POP-type instruction is processed, the expansion unit EXPCT supplies a saving or restoring micro-instruction μINS for saving or restoring a register. This micro-instruction is supplied to the execution stage EXEC which executes it to save or restore the corresponding register while a new micro-instruction is generated. When the content of the field PMSK reaches the value 0x0000, all the register-saving or -restoring micro-instructions have been generated. The field PMSK is then immediately reset to the value 0xFFFF.

To show the general operation of the expansion unit EXPCT in the case of a PUSH instruction, table 1 below gives, at each cycle, the values of the field PMSK, of the register NMSK and of the register number P calculated, when the immediate value IM associated with the instruction is equal, for example, to 0x1248.

TABLE 1

| Cycle | PMSK | NMSK | P | μINS |
|---|---|---|---|---|
| 1 | 0xFFFF | 0xFFF8 | 3 | PUSH R3 |
| 2 | 0xFFF0 | 0xFFC0 | 6 | PUSH R6 |
| 3 | 0xFF80 | 0xFE00 | 9 | PUSH R9 |
| 4 | 0xFC00 | 0xF000 | 12 | PUSH R12 |
| 5 | 0xE000 | 0x0000 | — | — |
|   | 0x0000 | — | — | — |

Table 1 shows that the PUSH instruction #0x1248 is successively broken down into PUSH micro-instructions for saving the registers R3, R6, R9 and R12.

In the same way, table 2 below shows the general operation of the expansion unit EXPCT in the case of a POP instruction associated with the immediate value IM=0x1248.

TABLE 2

| Cycle | PMSK | NMSK | P | μINS |
|---|---|---|---|---|
| 1 | 0xFFFF | 0x1FFF | 12 | POP R12 |
| 2 | 0x0FFF | 0x03FF | 9 | POP R9 |
| 3 | 0x01FF | 0x007F | 6 | POP R6 |
| 4 | 0x003F | 0x000F | 3 | POP R3 |
| 5 | 0x0007 | 0x0000 | — | — |
|   | 0x0000 | — | — | — |

Table 2 shows that the POP instruction #0x1248 is successively broken down into POP micro-instructions for restoring the registers R12, R9, R6 and R3.

The number of cycles necessary to supply all the micro-instructions for saving or restoring the registers depends on the number of registers to be saved, i.e., on the number of bits on 1 in the immediate value IM associated with the instruction.

It shall be noted that the order in which the registers are restored does correspond to the inverse order in which they are saved, which complies with the management of a memory stack.

Figure 9:
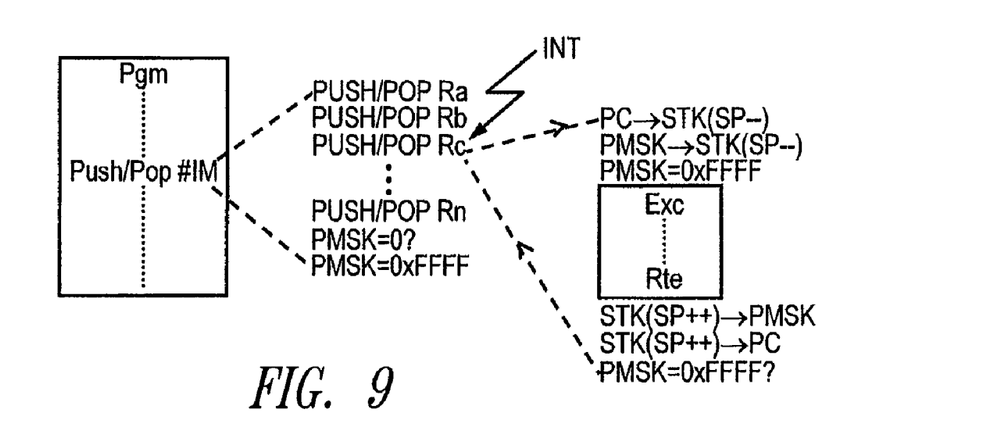
FIG. 9 shows an exemplary method for breaking down a saving/restoring instruction into micro-instructions, according to at least one embodiment.

FIG. 9 shows the processing for expanding a PUSH or POP instruction performed by the expansion unit EXPCT. This figure represents a program Pgm stored in the program memory PMEM of the microcontroller and comprising a PUSH or POP instruction followed by an immediate value IM. When the control unit CU receives such an instruction, it supplies the immediate value IM associated with the expansion unit EXPCT. The expansion unit EXPCT then successively supplies all the saving or restoring micro-instructions PUSH/POP Ri (i=a, b, c, etc. n) for saving or restoring the registers indicated by the value IM. Each micro-instruction appearing at output of the expansion unit EXPCT is sent to the decoding stage DEC by the control unit CU. As soon as the field PMSK is zero, it is reset to the value 0xFFFF.

If an interruption INT occurs during the saving or the restoration of the registers Ri, the control unit CU saves in the memory stack the program pointer register PC and the status register SR containing the field PMSK (PC→STK(SP−−) and PMSK→STK(SP−−)). Before each save, the control unit decrements the stack pointer SP. Then, the control unit initializes the field PMSK to 0xFFFF so as to enable a PUSH or POP instruction to be executed in the interrupt routine Exc, and starts the execution of the latter. Upon the execution of the last instruction Rte of the interrupt routine, the control unit CU restores the status register SR containing the field PMSK and the register PC, saved in the memory stack STK (STK(SP++)→PMSK and STK(SP++)→PC). Following each restoration, the stack pointer SP is incremented. If the value of the field PMSK is different from its initial value 0xFFFF (PMSK=0xFFFF?), this means that the execution of the instruction in progress (indicated by the register PC) has not been completed. The control unit then resumes the execution of the saving or of the restoration of the registers Ri from the step at which the latter was interrupted. This resumption is made possible thanks to the field PMSK which has been saved, then restored, and the content of which reflects the progress status of the interrupted execution of the PUSH or POP instruction.

It will be understood by those skilled in the art that various other alternative embodiments and applications of the method and the device described above are possible. In particular, the method described can be applied in the event that all the registers Ri are systematically saved or restored, i.e., when the saving/restoring instruction is not associated with an immediate value specifying the registers that must be saved or restored.

It is not necessary either for the progress status of the saving or of the restoration PMSK to be stored in the status register SR of the microcontroller. This progress status can be stored in any other register or even a specific register. Regardless of its storage location, this progress status is saved upon a switch of task or the execution of an interruption. Storing the progress status of the saving/restoration in the status register of the processor offers the advantage of an automatic and systematic save and restoration in most microcontrollers and microprocessors. Using an unused field of the status register also avoids increasing the number of registers which must be saved and restored upon each interruption in a task, and does not therefore increase the latency time for executing an interruption.

Furthermore, ways other than those described above can be considered for storing the progress status of the operations of saving and restoring registers. For example, PMSK can store the number of the last register saved or restored or of the first register which has not been saved or restored.

The method according to the present invention can also be applied to a microprocessor (not comprising any program memory or internal datum), and more generally, to any microprocessor or microcontroller comprising, in its instruction set, saving/restoring instructions for saving/restoring several registers, such instructions being executed by a prior breakdown into micro-instructions. Furthermore, it is not essential for the microprocessor or microcontroller to have a pipeline-type architecture or an architecture equivalent to the one described with reference to FIG. 1.

The invention claimed is:

1. A method for executing by a processor, comprising:
  executing an instruction for saving/restoring several registers of the processor during a context switch triggered by an interruption in a task by another task, the executing including:
  breaking down the saving/restoring instruction to generate micro-instructions for saving/restoring the content of a register;
  executing each of the micro-instructions;
  initializing a progress status of the saving/restoring of the registers;
  updating the progress status of the saving/restoring upon each generation of a micro-instruction for saving/restoring a register;
  saving the progress status in the event of an interruption in the saving/restoring of the registers to execute a higher-priority task; and
  restoring the progress status when the saving/restoring of the registers is resumed.

2. The method according to claim 1, wherein saving the progress status of the saving/restoration comprises storing the progress status in a status register of the processor.

3. The method according to claim 2, wherein saving the progress status comprises automatically storing the status register of the processor in the event of an interruption in the execution of a task by a higher-priority task.

4. The method according to claim 1, wherein the saving/restoring instruction concerns all the registers of a set of general registers of the processor.

5. The method according to claim 1, wherein the registers to be saved/restored are indicated in a binary word associated with the saving/restoring instruction.

6. The method according to claim 5, wherein each bit of the binary word with a value of one indicates by its rank in the binary word a number of a register to be saved/restored, and the method further comprising:
  extracting the rank of a bit of the binary word, wherein the value of the bit is one.

7. The method according to claim 1, wherein saving the progress status of the saving/restoration comprises storing the progress status in the form of a binary word, the bits of which in a predefined state indicate by their rank the registers already saved/restored.

8. The method according to claim 7, wherein initializing a progress status of the saving/restoration comprises initializing the progress status at the end of the execution of the saving/restoring instruction, to an initial value indicating that no register has been saved or restored.

9. The method according to claim 1, wherein initializing a progress status of the saving/restoration, comprises initializing the progress status after being saved, in the event of an interruption in the saving/restoration of registers.

10. A processor, comprising:
  an expansion unit operable to break down an instruction for saving/restoring several registers of the processor, the instruction fetched during a context switch triggered by an interruption in a task by another task, and the expansion unit further operable to generate micro-instructions for saving/restoring the content of a register executable by an execution stage of the processor;
  means for initializing a progress status of the execution of an instruction for saving/restoring registers;
  circuits for updating the progress status upon each generation of a micro-instruction for saving/restoring a register;
  means for saving the progress status in the event of an interruption in the execution of an instruction for saving/restoring registers, the interruption by a higher-priority task; and
  means for restoring the progress status when the execution of the saving/restoring instruction is resumed.

11. The device according to claim 10, wherein the saving/restoring instruction concerns all the registers of a set of general registers of the processor.

12. The device according to claim 10, wherein the registers to be saved/restored are indicated in a binary word associated with the saving/restoring instruction.

13. The device according to claim 12, wherein each bit of the binary word with a value of one indicates by its rank in the binary word a number of a register to be saved/restored, and the device of claim 12 further comprising:
  circuits for extracting the rank of a bit of the binary word, wherein the value of the bit is one.

14. The device according to claim 10, wherein the progress status of the saving/restoration is stored in the form of a binary word, the bits with a value of zero indicating by their rank the registers already saved/restored.

15. The device according to claim 10, further comprising:
  means for initializing the progress status of the saving/restoration at the end of the execution of the saving/restoring instruction, to an initial value indicating that no register has been saved or restored.

16. The device according to claim 10, further comprising:
  means for initializing the progress status of the saving/restoration after saving the progress status of the saving/restoration, in the event of an interruption in the saving/restoration of the registers.

17. A processor comprising:
  a set of general registers;
  a set of instructions including instructions for saving/restoring several general registers during a context switch; and
  a device that includes:
    an expansion unit to break down an instruction for saving/restoring several registers and to generate micro-instructions for saving/restoring the content of a register executable by an execution stage of the processor;
    means for initializing a progress status of the execution of an instruction for saving/restoring registers;
    circuits for updating the progress status upon each generation of a micro-instruction for saving/restoring a register;
    means for saving the progress status in the event of an interruption in the execution of an instruction for saving/restoring registers, the interruption by a higher-priority task; and
    means for restoring the progress status when the execution of the saving/restoring instruction is resumed.

18. The processor according to claim 17, wherein the progress status of the saving/restoration is stored in a status register of the processor.

19. The processor according to claim 18, further comprising:
  means for automatically storing the status register of the processor in the event of an interruption in the execution of a task, the interruption by a higher-priority task.

20. The processor according to claim 17, having a pipeline-type architecture, and wherein the device belongs to a read and pre-decode stage enabling an instruction to be read in the program memory and the instruction read to be pre-decoded.

21. The processor according to claim 17, wherein the processor is of a microprocessor or microcontroller type.

22. A method for saving or restoring a plurality of registers of a processor, the plurality of registers being associated with an executing or previously-executing task, respectively, the method comprising:
generating, during a context switch, a plurality of micro-instructions from an instruction to save or restore the plurality of registers, each micro-instruction for saving or restoring a subset of the plurality of registers such that the micro-instructions allow the execution of the instruction to be interruptible by a higher-priority task;
initializing a progress status;
updating the progress status to reflect which of the plurality of micro-instructions have been executed thus far and therefore which of the subsets of the plurality of registers have been saved or restored; and
storing the progress status so that the instruction to save or restore the plurality of registers can be interrupted by the higher-priority task while allowing the updated progress status to be restored upon resumption of the micro-instructions.

23. The method of claim 22, further comprising:
restoring the progress status when the instruction to save or restore the plurality of registers is resumed; and
continuing to update the progress status to reflect which of the plurality of micro-instructions have been executed thus far and therefore which of the subsets of the plurality of registers have been saved or restored.

24. The method of claim 22, wherein storing the progress status comprises storing the progress status in a status register of the processor.

25. The method of claim 22, wherein the instruction to save or restore the plurality of registers comprises an instruction to save or restore all registers of a set of general registers of the processor.

26. The method of claim 22, wherein the instruction to save or restore the plurality of registers has an associated binary word, each bit of the binary word indicating a register number correlated to the position of the bit within the binary word, the method further comprising:
determining the position of each bit having a predetermined value, the predetermined value indicating that the register, designated by the register number correlated to the position of the bit, is to be saved or restored.

27. The method of claim 22, wherein storing the progress status comprises storing the progress status in the form of a binary word, each bit of the binary word indicating a register number correlated to the position of the bit within the binary word, a predetermined value of each bit indicating that the correlated register number has been saved or restored.

28. A processor, comprising:
an expansion unit operable to generate a plurality of micro-instructions from a save instruction executed to save a plurality of registers during a context switch;
an execution unit operable to execute the plurality of micro-instructions;
a progress status operable to represent the progress of execution of the plurality of micro-instructions; and
a memory to store the progress status when the execution unit is interrupted.

29. The processor of claim 28 wherein the progress status is a plurality of register bits and each bit of the plurality of register bits represents one of the plurality of registers to be saved.

30. The processor of claim 29, further comprising:
an update unit operable to set at least one of the plurality of register bits of the progress status.

31. The processor of claim 30 wherein the update unit is further operable to initialize the progress status after detection of the interrupt.

* * * * *